United States Patent [19]

Renner et al.

[11] Patent Number: 5,393,164

[45] Date of Patent: Feb. 28, 1995

[54] ARC WELDED JOINT BETWEEN A CARRIER AND A COMPONENT RIGIDLY CONNECTED TO IT

[75] Inventors: Wolf Renner, Giessen; Dieter Mauer, Lollar, both of Germany

[73] Assignee: Emhart Inc., Newark, Del.

[21] Appl. No.: 272,956

[22] Filed: Jul. 11, 1994

Related U.S. Application Data

[63] Continuation of Ser. No. 923,393, Jul. 13, 1992, abandoned.

[30] Foreign Application Priority Data

| Aug. 2, 1991 | [DE] | Germany | 4125748 |
| Aug. 20, 1991 | [DE] | Germany | 4127527 |
| Sep. 20, 1991 | [DE] | Germany | 4131405 |
| Apr. 14, 1992 | [DE] | Germany | 4212513 |

[51] Int. Cl.⁶ ............................ F16B 5/08
[52] U.S. Cl. ......................... 403/271; 403/270; 219/99; 411/171
[58] Field of Search ........... 403/270, 271, 272, 265, 403/269, 268; 219/99, 98; 228/165; 411/171, 930, 258

[56] References Cited

U.S. PATENT DOCUMENTS

| 2,635,167 | 4/1953 | Nelson | 403/271 X |
| 2,826,439 | 3/1958 | Sholle et al. | 219/98 X |
| 2,867,714 | 1/1959 | MacLachlan | |
| 2,896,065 | 7/1959 | Murdock et al. | 219/98 X |
| 2,922,542 | 1/1960 | Barr | 219/99 X |
| 2,950,379 | 8/1960 | Dash | 219/99 |
| 3,010,011 | 11/1961 | Darlington, Jr. | |
| 3,095,951 | 7/1963 | Rood et al. | 403/272 |
| 3,182,172 | 5/1965 | Dash | 219/98 |
| 3,308,531 | 3/1967 | Wasserkampf | 219/99 X |
| 3,312,315 | 4/1967 | Graham | 219/98 X |
| 3,597,573 | 8/1971 | Ettinger | 219/99 |
| 3,705,972 | 12/1972 | Trojani | 219/98 X |
| 3,706,870 | 12/1972 | Sauder et al. | 219/98 X |
| 3,774,009 | 11/1973 | Hodges | 219/98 |
| 3,891,332 | 6/1975 | Molyneux et al. | 403/272 X |
| 3,997,754 | 12/1976 | Moliner et al. | 219/98 X |
| 4,359,813 | 11/1982 | Mauer | 219/99 X |

FOREIGN PATENT DOCUMENTS

| 2227384 | 2/1973 | Germany | 219/98 |
| 2532252 | 2/1977 | Germany | 219/98 |
| 3149513 | 6/1983 | Germany | 219/99 |
| 3340071 | 8/1985 | Germany | 219/98 |
| 202980 | 11/1983 | Japan | 219/99 |
| 162581 | 8/1985 | Japan | 219/99 |

OTHER PUBLICATIONS

Research Disclosure No. 308, Dec. 1989, New York (USA).

*Primary Examiner*—Eric K. Nicholson
*Assistant Examiner*—Harry C. Kim
*Attorney, Agent, or Firm*—E. D. Murphy

[57] ABSTRACT

Arc welded joint between a carrier such as aluminium sheet as one electrode and as the other electrode a metal component with a continuous recess into which a stud-like weld-in part is introduced, wherein the weld-in part consists of a shank and a head which is enlarged in relation to the shank diameter via a step, penetrates into the recess in the component resting on the carrier and can be pressed into the pool of melt formed on the carrier so that the pool of melt adjacent to the wall of the recess embraces the outer rim of the head and the step, the pool of melt directly connecting the component, at least in the region of the edge of the wall of the recess facing the carrier, directly to the adjacent carrier. The outer rim of the weld-in part may protrude slightly beyond the component and penetrate into the recess with a projection or step such that, remote from the carrier, it can be pressed into the pool of melt to cover the entire wall of the recess including its two edges to its outer rim as well as the carrier and the head. The rim of the head may be designed as a radial melting edge which is located completely within the recess of the component and has a substantially blade-like cross section.

9 Claims, 7 Drawing Sheets

ARC WELDED JOINT BETWEEN A CARRIER AND A COMPONENT RIGIDLY CONNECTED TO IT

This is a continuation of applications(s) Ser. No. 07/923,393, filed on Jul. 31, 1992, now abandoned.

BACKGROUND OF THE INVENTION

The invention relates to an arc welded joint between a carrier as one electrode and a metal component with a continuous recess into which a stud-like weld-in part is introduced as the other electrode, which is rigidly connected to the carrier and the component by arc welding.

A welded joint of this type is known from DE-AS 1 565 563. With this welded joint a shell-type metal sheet is arranged on a steel carrier, fox which purpose the shell-type metal sheet is pressed against the steel carrier by means of a steel plate welded on the steel carrier. The weld between the steel plate and the steel carrier is produced by means of a stud which passes through the steel plate and is also guided through a hole in the shell-type metal sheet. The stud is welded to the steel carrier by arc butt welding, a continuous weld being produced between the steel carrier, the stud and the steel plate. This weld is not impaired by the shell-type metal sheet because its hole is sufficiently large for its rims still to be at a considerable distance from the weld. Furthermore, the shell-type metal sheet should not be included in the weld because it is usually provided with a corrosion-preventing coating, for example zinc coating or plastics material. These coatings, in particular zinc, would evaporate during the welding process. The vapour penetrating the weld impairs the alloy forming the welding pool. Furthermore, the shell-type metal sheet complicates the welding process as it necessarily produces a distance between the steel carrier and the steel plate which then has to be bridged over by the pool of melt and the weld produced from it.

One object of the present invention is to design the bond produced by the weld between a carrier, a metal component and a stud-like weld-in part particularly thoroughly and therefore with comparatively high strength.

BRIEF DESCRIPTION OF THE INVENTION

According to the present invention, we provide an arc-welded joint between a carrier as one electrode and a metal component with a continuous recess into which a stud-like weld-in part is introduced as the other electrode which is rigidly connected to the carrier and the component by arc welding wherein the weld-in part consists of a shank and a head which is enlarged in relation to the shank diameter via a step, penetrates into the recess in the component resting on the carrier and, owing to the formation of a pool of melt on the carrier, can be pressed into this pool of melt such that the pool of melt adjacent to the wall of the recess embraces the outer rim of the head and the step, the pool of melt directly connecting the component, at least in the region of the edge of the wall of the recess facing the carrier, directly to the adjacent carrier.

Owing to the construction of the weld-in part from a shank having a head which is enlarged in relation to it and owing to the use of the pool of melt pressed up over the outer rim of the head, the space between the end face of the head and the component is reliably and completely filled by the pool of melt which penetrates the carrier, the wall of the recess and the weld-in part and rises adjacently to the wall of the recess, on the one hand, and passes over the outer rim of the head and the step on the other hand. This produces mainly an intensive weld in the region of the edge of the wall of the recess facing the carrier and the carrier resting on the component and—resembling a riveted joint—the surrounding of the head in the step region so that the component resting directly on the carrier is securely welded at the critical point of the edge of the wall of the recess facing the carrier and, on the other hand, the weld-in part is continuously drawn to the carrier by the pool of melt passing over the step, the weld-in part pressing the wall parts of the recess connected to it via the pool of melt against the carrier.

Preferably, the weld-in part consists of a shank and a head which is enlarged relative to the shank diameter by a step, protrudes with its outer rim slightly beyond the component and penetrates into the recess in the component resting on the carrier with a projection such that, owing to the formation of an arc extending to the edge, remote from the carrier, of the wall of the recess, the projection can be pressed into the pool of melt to cover the entire wall of the recess including its two edges as well as the carrier and the head to its outer rim.

Owing to the construction of the weld-in part from a shank having a head which is enlarged relative thereto and which protrudes with its outer rim slightly beyond the component, the effect is achieved that the electric arc travels from the end face of the head toward this outer rim until it reaches the edge, remote from the carrier, of the wall of the recess and incorporates this edge in the pool of melt which is being formed. The pool of melt is therefore supplied to a considerable extent out of the projection or step of the weld-in part penetrating into the recess of the component so that a pool of melt is formed which covers the entire wall of the recess including its two edges as well as the carrier and the head virtually to its outer rim, the step behind the outer rim of the head preventing the electric arc from travelling beyond the outer rim. Owing to the slight protrusion of the outer rim beyond the respective edge of the recess, this edge is reliably included in the pool of melt, resulting in reliable welding which covers the entire wall of the recess including its two edges as well as the carrier and the head up to its outer rim.

The head is preferably constructed such that it is substantially lenticular in design round its outer rim and the projection projects substantially cylindrically round the depth of the recess. The projection therefore substantially fills the recess and therefore makes an adequate quantity of material available for the formation of a uniform pool of melt on melting.

It is a further object of the invention to design the weld-in part so that automatic centering of the weld-in part in the recess in the metal component takes place when weld-in part and metal component are brought together.

In another preferred embodiment of the invention, this can be achieved in that the rim of the head is designed as a radial melting rim which is located completely inside the recess in the component and has a substantially blade-like cross section.

When this weld-in part and the component are brought together, the blade-like rim of the head is received completely within the recess of the component, ensuring that the weld-in part does not rest somehow laterally next to or partially next to the recess of the component. Complete introduction of the rim of the head of the weld-in part into the recess therefore guarantees centering of weld-in part and recess so that coaxial centering is not necessary. Even when the rim of the weld-in part does in fact rest on the internal face of the recess, arcing initially occurs at the point of contact when the arc is switched on and a radial distance is formed between the head and the recess as the rim melts there so that the arc between the head and the component is finally distributed over the entire rim of the weld-in part and the entire rim is caused to melt. This produces a distance between the head and the recess which is such that the arc passes over the curvature and concentrates thereon. This distribution of the arc over the entire rim of the head of the weld-in part causes melting which extends over the entire rim, owing to the blade-like cross section of the rim, and therefore results in a pool of melt in the region of the bottom of the recess into which the weld-in part can then finally be pressed, as described in the main patent, for welding the component to the carrier.

The blade-like cross section in the region of the rim of the head ensures rapid melting of this rim and therefore the direct formation of the pool of melt. The blade-like cross section is still maintained in principle even if the melting rim is formed as a thin disc projecting radially from the head, as the thin disc projecting radially from the head, as the thin disc can be melted quickly and the pool of melt consequently forms correspondingly quickly.

It is yet another object of the invention to design the weld-in part so as to provide substantially uniform heat distribution over the weld-in part during the welding process. According to the present invention, this may be achieved by providing the weld-in part with a bore which extends through the shank into the head and is such that the wall thickness of the shank in the bore region corresponds approximately to the thickness of the end wall of the bore of the welding zone in the welded state.

The bore extending into the head results, on the one hand, in heat dissipation which is considerably reduced in relation to a solid weld-in part during the welding process, which has a desirable influence on the energy requirement for the welding process, and, on the other hand, in heat distribution over all parts to be welded which extends substantially uniformly over the parts so that extreme heating at specific points of the parts to be welded is avoided. The heat capacity of the weld-in part which is reduced owing to the bore extending into the head also leads to a substantially uniform cooling rate over the entire welding region during the cooling process so that the weld is kept free from internal stresses.

It is expedient to adapt the diameter of the bore to the periphery of expanding jaws of a setting tool constructed as a welding tool so that the weld-in part can be conveyed in a desirable manner, i.e. it is taken from a magazine, transferred to the welding point and positioned thereon. The gripping of the weld-in part via the wall of the bore allows considerable expansion forces and consequently good contact so that virtually no harmful resistances to transmission can build up at the contact point. The gripping of the weld-in part from the interior allows particularly accurate positioning as virtually no displacement thereof can occur when the weld-in part is gripped by the expanding jaws.

The following state of the art is mentioned for the sake of completeness:

A process for fastening plates on aluminium sheets is described in DE-OS 3 149 513, in which the plates are provided, in the sense of the above-mentioned metal component, with a hole to which an aluminium stud is inserted as an electrode for an arc welding process. The stud is to be connected to the metal sheet (in the sense of the foregoing carrier) only but its end face as the plate to be fastened on the the metal sheet is provided, on the side facing the metal sheet, with an indentation which receives spurting metal during the welding process and therefore prevents this metal from passing between plate and metal sheet. The plate is fastened on the metal sheet by the aluminium stud which is mushroom-shaped and presses onto the plate with its head which is constructed slightly conically on its underside. The resultant tensile forces are then absorbed only by the welding on the end face of the stud as a comprehensive weld which also includes the plate is not intended with the process. The idea of including the wall of the recess in the weld, which emerges from the above described invention, and, in particular, the passing of the melt bath over the step is therefore completely lacking in the design produced by the known process.

With a process known from DE 18 11 820 for the welding of studs onto a carrier with interposed zinc-coated sheet metal employing the stud welding process, the hole required in the sheet metal for guiding through the stud and welding it to the carrier is provided by burning through the sheet metal during the burning of the arc required for welding. This burning of the arc while the sheet metal is burning through is adjusted such that zinc vapours formed in the process are removed before initiation of the actual welding current for connecting stud and carrier.

Reference is finally made to GB-PS 1 000 577 which disclosed a weld stud consisting of a shank and a head which is enlarged in relation to it and of which the end face forms the weld point. The end face can be conical or curved in design. In the case of the design with an enlarged head, the curvature passes via a sharp edge in a cone which tapers in the direction toward the shank and which the cylindrical shank then adjoins. Nothing else about the use of this weld stud can be inferred from this document.

BRIEF DESCRIPTION OF THE DRAWINGS

In order that the invention may be better understood, a number of embodiments will be described in greater detail by way of example with reference to the accompanying drawings, in which.

DETAILED DESCRIPTION OF EMBODIMENTS AND DRAWINGS

Figure 1:
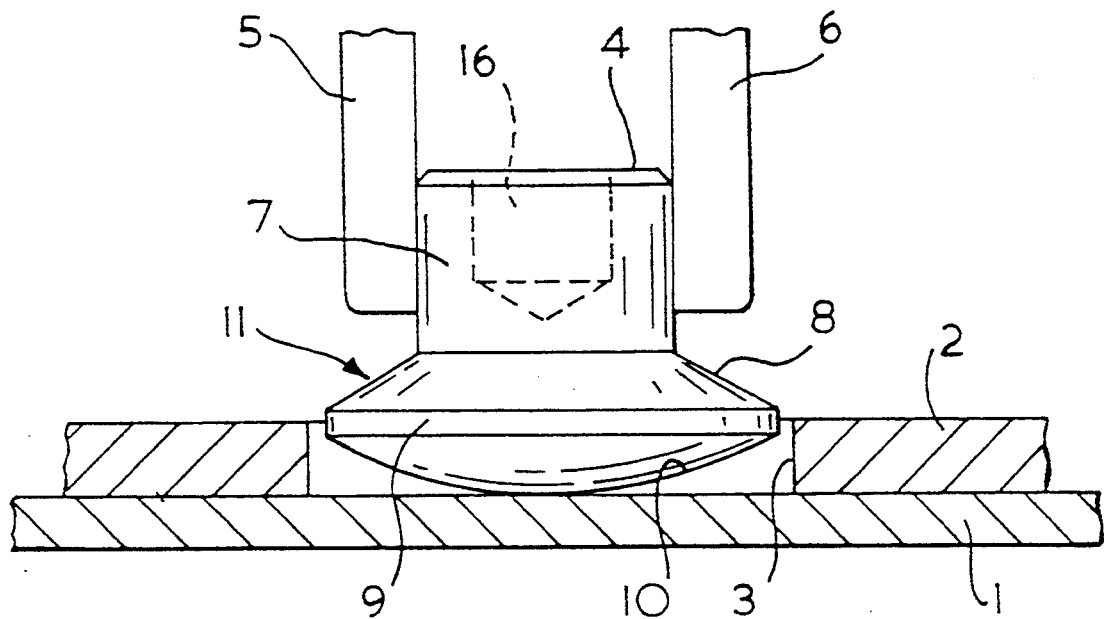
FIG. 1 shows the assembly of carrier, metal component and weld-in part in the position of contact between carrier and weld-in part.

Referring to the embodiment illustrated by FIGS. 1, 2, 3 and 4, FIG. 1 shows the carrier 1 which is constructed from a piece of sheet metal and onto which the metal component 2, which can be formed, for example, from a sheet metal strip, is placed directly. The metal component 2 is provided with the recess 3 which is a round bore in the simplest case into which the weld-in part or plug 4 is inserted. The weld-in part 4 is held by a welding tool of which only the holding jaws 5 and 6 are indicated schematically here. As the arc welding process used in this connection is a known process, reference is made to known welding tools which are provided with corresponding clamping jaws.

The weld-in part 4 has the shank 7 which is preferably cylindrical in design. The shank 7 passes via the cone 8 into the rim 9 which si also preferably constructed cylindrically. The spherically shaped camber 10 adjoins the rim 9. Cone 8, rim 9 and camber 10 therefore form a head 11 whose external diameter provided by the rim 9 is greater than the diameter of the shank 7. The diameter of the head 11 is smaller than the opening of the recess 3 so that the head 11 is held in the recess 3 relative to the component 2 substantially without contact. The cone 8 forms the above-mentioned step which can also be constructed as a radial face. A bore 16 which can serve to receive any parts is provided in the shank 7.

The weld-in part 4 is pressed against the carrier 1 by the holding jaws 5 and 6. The carrier 1 forms one electrode and the weld-in part 4 the other electrode for a voltage which serves to ignite a welding arc and is applied in a known manner to the welding tool (not shown) and the carrier 1. The welding arc is then struck in a known manner by lifting the weld-in part 4 from the carrier 1.

Figure 2:
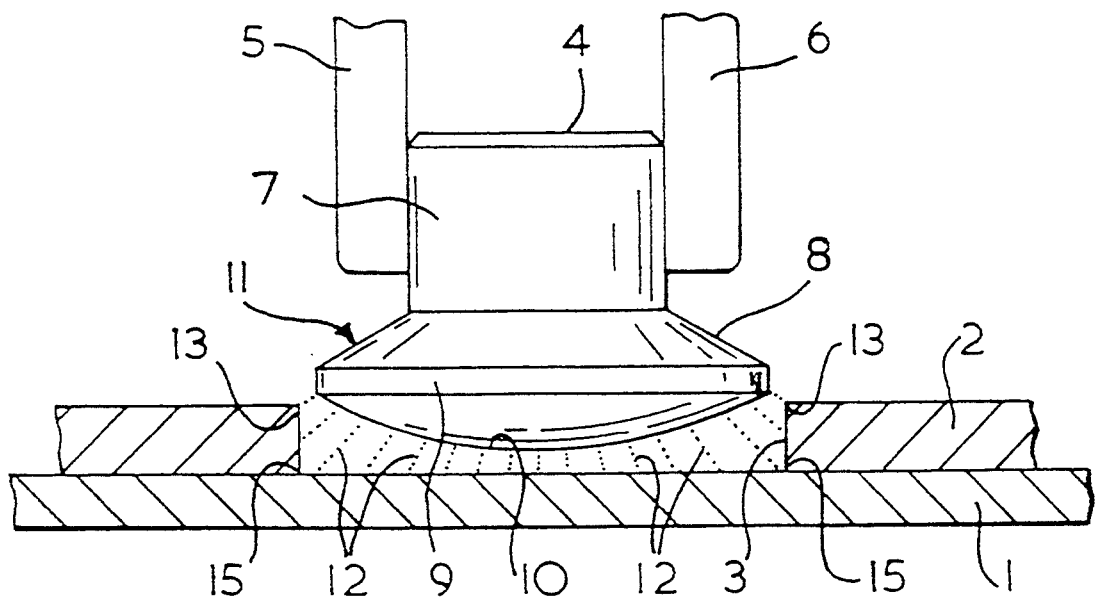
FIG. 2 shows the arrangement of FIG. 1 with the weld-in part lifted from the carrier and with the arc formed.

FIG. 2 shows the same arrangement with the struck arc, which is indicated here by the dotted lines 12 radiating from the camber 10. Owing to the contact in the centre of the camber 10 shown in FIG. 1, the welding arc is initially ignited at this point which, after the weld-in part 4 has been lifted from the carrier 1, forms the shortest path for the arc so that the arc causes the carrier to melt in the region of the foremost part of the camber 10 relative to the carrier 1. Owing to the subsequent increase in the welding current, following in a known manner, the arc also encompasses the outer regions of the camber 10 and finally passes into the region of the upper edge 13 of the recess 3, producing a pool of melt or weld metal which covers the entire surface of the carrier 1 opposite the camber 10, the camber 10 and the well of the recess 3. A flat cone can also be provided instead of the camber 10.

Figure 3:
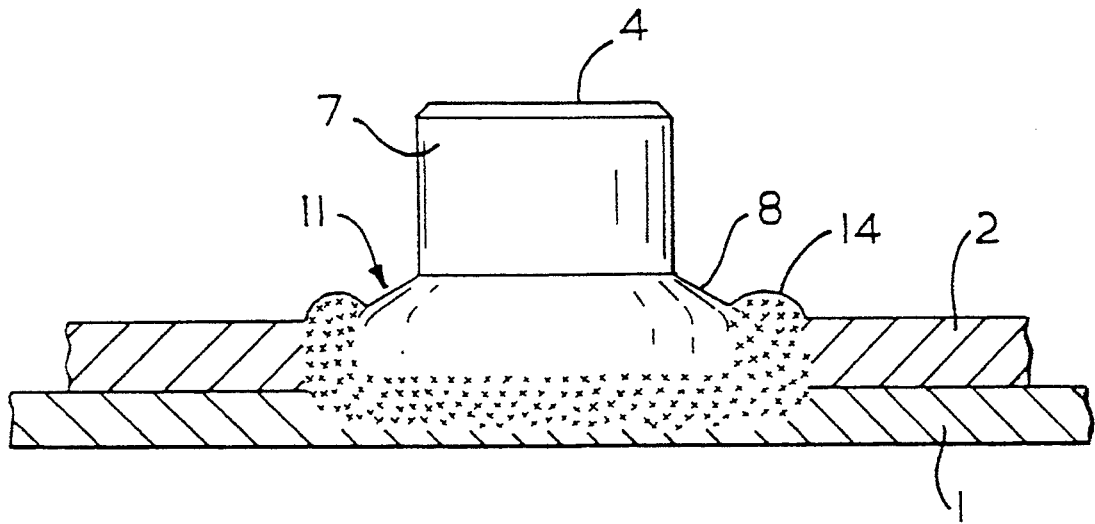
FIG. 3 shows the arrangement of FIG. 1 with a solidified pool of melt.

As the weld-in part 4 is again brought toward the carrier 1, the weld-in part 4 plunges with its camber 10 in the pool of melt and, in so doing, displaces the melt which, as shown in FIG. 3, rises between the rim 9 and the wall of the recess 3 and finally passes over the edge 9 and the cone 8, forming the bead 14. In the process of melting and forming the pool of melt, the edge 15 of the wall of the recess 3 resting on the carrier 1 is mainly included so that the pool of melt is also formed at this point which is particularly important for the rigid connection, the pool of melt penetrating into the carrier 1, the component 2 and the weld-in part 4 so as to produce, between the parts, an intimate connection which is particularly reinforced by the bead 14 which, in a manner of speaking, presses the head 11 of the weld-in part 4 against the component as with riveting.

Figure 4:
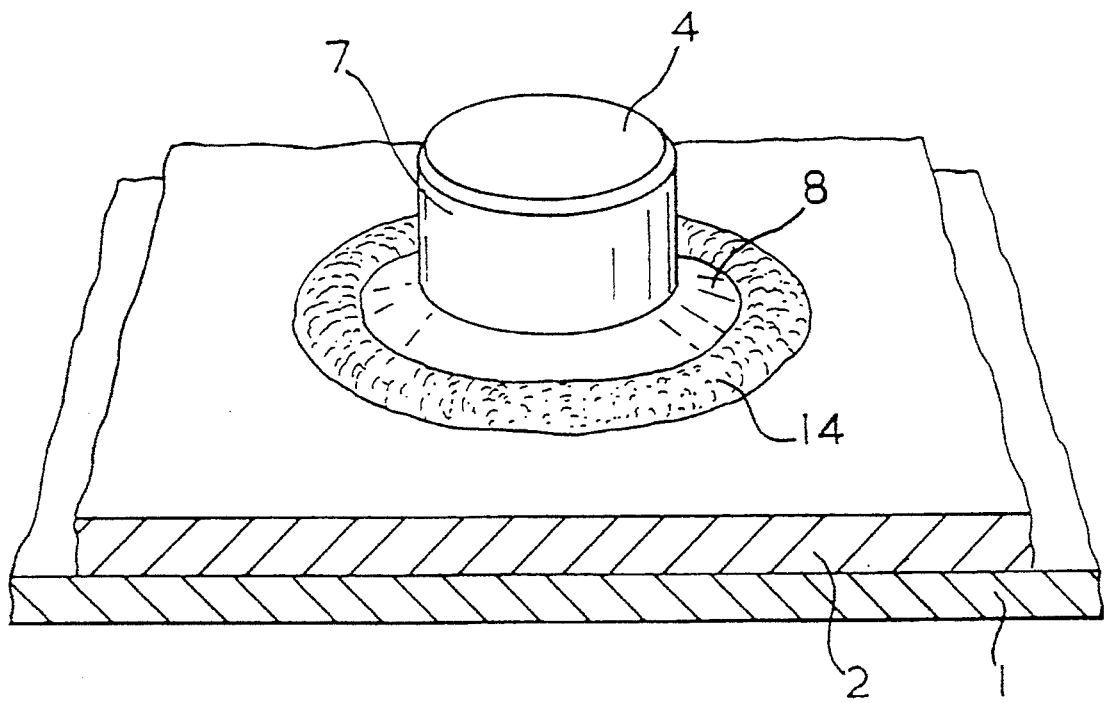
FIG. 4 is a perspective view of two metal sheets which are welded to one another using the embodiment of FIG. 1 and of the weld-in part projecting from the upper metal sheet.

FIG. 4 shows the weld between the carrier 1 and the component 2 in a perspective view. The weld-in part 4 projects from the component 2 round which the bead 14 formed by the raised and solidified pool of melt extends and additionally embraces the weld-in part 4.

The carrier and the metal component may be metal sheets or the like. It is also possible to construct the metal component as a thicker constructional element which then merely has to be provided with the above-described recess into which the head of the weld-in part has to penetrate. The described arc weld is also suitable, in particular, for the welding of aluminium parts with which welding is known to be difficult. In particular, aluminium sheets can only be connected to one another with difficulty by the known spot welding process as the oxide skin present on the aluminium sheets has to be broken through. Apart from this, it should be noted during spot welding that the electrodes placed on the metal sheets are contaminated relatively rapidly and therefore have to be continually cleaned. With the arc welded joint according to the invention, on the other hand, new electrodes are constantly provided, namely in the form of the carrier on the one hand and in the form of the weld-in part on the other hand.

Figure 8:
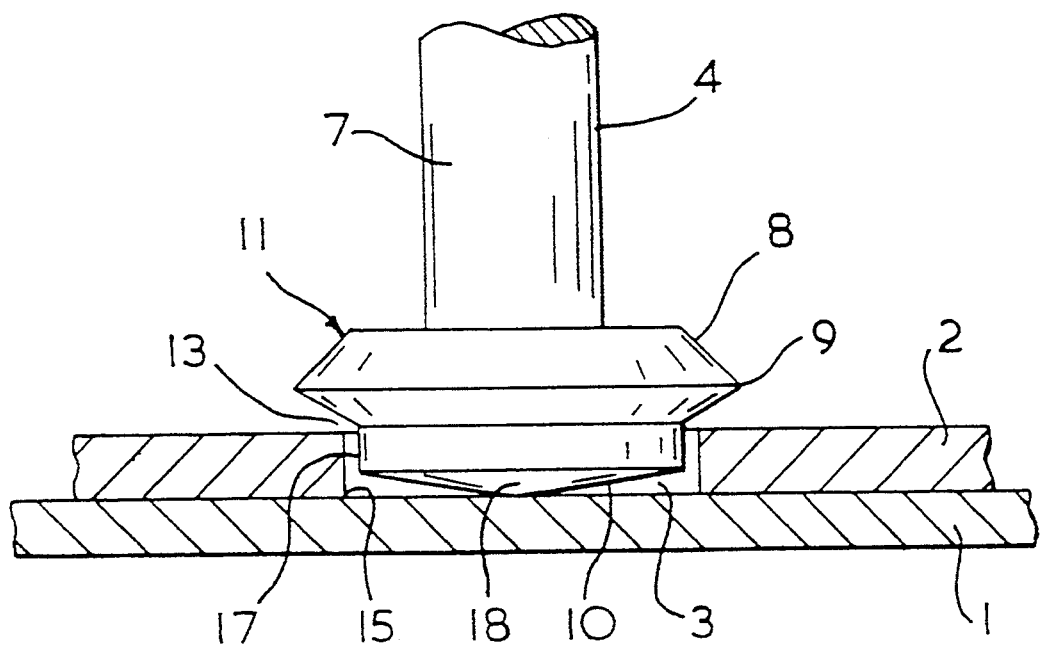
FIG. 8 shows the assembly of carrier, metal component and a modified weld-in part in the position of contact between carrier and weld-in part.
Figure 9:
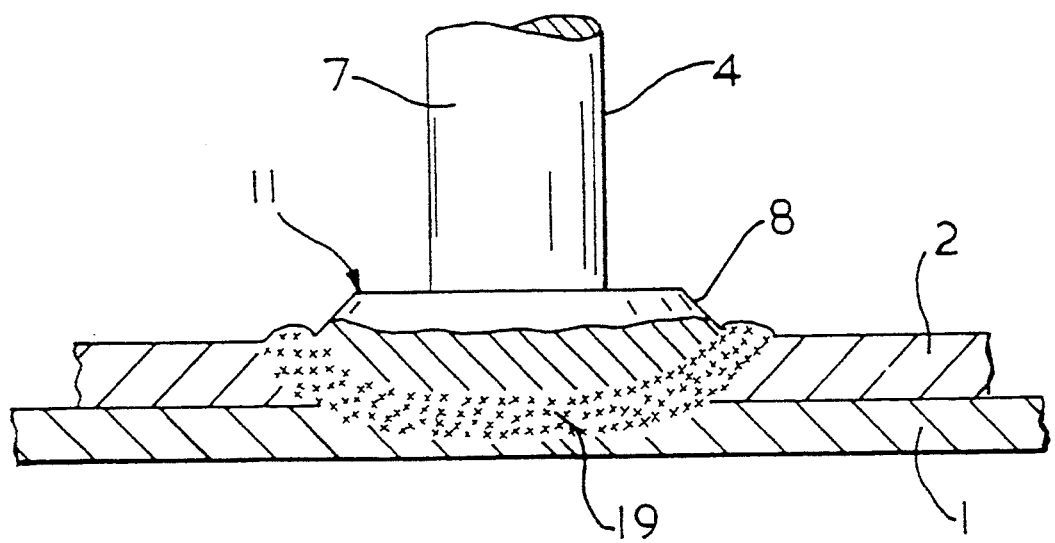
FIG. 9 shows the arrangement of FIG. 8 after electric arc welding with a solidified pool of melt.

Referring to the embodiment illustrated by FIGS. 8 and 9, FIG. 8 shows the carrier 1 which is formed from a piece of sheet metal and onto which there is directly placed the metal component 2 which can be formed, for example, from a sheet metal strip. The metal component 2 is provided with the recess 3, a round bore into which the weld-in part 4 is inserted in the simplest case. The weld-in part 4 is held in a known manner by any welding tool.

The weld-in part 4 has the shank 7 which is preferably cylindrical in construction. The shank 7 passes into the lenticular head 11 which extends via the conical step 8 to its outer rim 9. The outer rim 9 protrudes slightly beyond the component 2, i.e. the rim 9 has a slightly greater diameter than the recess 3 in the case of cylindrical design. The lenticular head 11 is then followed by the step 17 which penetrates into the recess 3 and finally passes into the cone 10 resting with its tip 18 on the carrier 1. The weld-in part 4 and the carrier 1 form the two electrodes for the electric arc which is being formed, an electric contact between the carrier 1 and the metal component 2 obviously also existing owing to the resting of the metal component 2 on the carrier 1.

The step 17 has a somewhat smaller diameter than the recess 3 so that, after retraction of the weld-in part 4 from the carrier 1, an electric arc is formed between the cone 10 and the carrier 1, the electric arc expanding with a corresponding increase in the welding current over the total projection 3 and the head 11 to the outer rim 9 thereof. The electric arc causes the edge 13 to melt in the region between the outer rim 9 and the edge 13 of the component 2. The pool of melt being formed between the cone 10 and the carrier 1 is also supplied by material from the step 17 so that the pressing of the weld-in part 4 into the pool of melt results in welding to beyond the edge 13 which is partially melted in the process, forming an intimate rigid joint between the weld-in part 4, the component 2 and the carrier 1.

FIG. 9 shows the welded-in weld-in part 4. As shown, a weld zone 19 which extends to and includes the outer rim 9 is formed. The molten outer rim 9 is located substantially at the level of the surface, remote from the carrier 1, of the component 2, the weld-in zone 19 being shown as a slight elevation at the surface of the component.

Referring now to the embodiment illustrated in FIGS. 10, 11, 12 and 13, FIG. 10 shows the carrier 1 which is formed from a piece of sheet metal and onto which the metal component 2, which may be formed, for example, by a strip of sheet metal, is placed directly. The metal component 2 is provided with the recess 3, in the simplest case a round bore into which the weld-in part 4 is inserted. As described above, the weld-in part 4 is held by a suitable welding tool and is introduced into the recess 3.

The weld-in part 4 has the stem 7 which is preferably cylindrical in design. The head 11 is formed from the cone 8, the thin disc 9A and the camber 10 adjoins the stem 7. In this case, the thin disc 9A projects radially outwardly in the form of a blade or disc from the head 11. The diameter of the thin disc 9A is smaller than the diameter of the recess 3 so that the thin disc 9A rests completely within the recess 3 when weld-in part 4 and component 2 are brought together. The height of the camber 10 and the thickness of the component 2 are appropriately adapted to one another.

The weld-in part 4 is automatically centred relative to the component 2 as weld-in part 4 and component 2 are brought together because the thin disc 9A has a smaller diameter than the recess 3, and it is quite possible for the thin disc 9A to come into contact with the wall of the recess 3, as shown at point 12.

Figure 10:
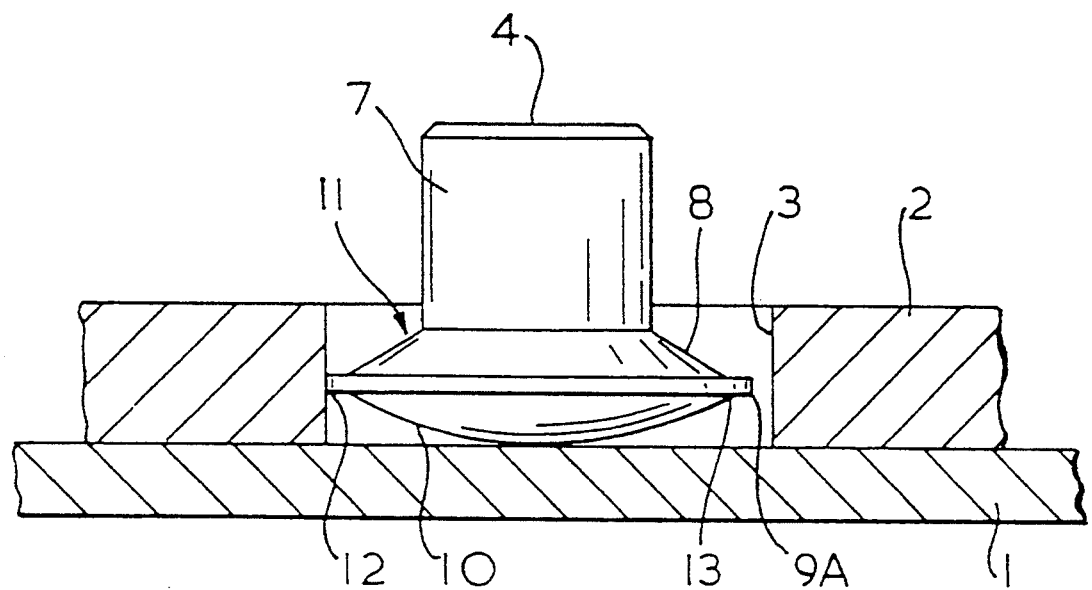
FIG. 10 shows a fourth variant of the weld-in part, inserted into a metal component, with lateral contact of the rim of the weld-in part on the internal face of the recess.
Figure 11:
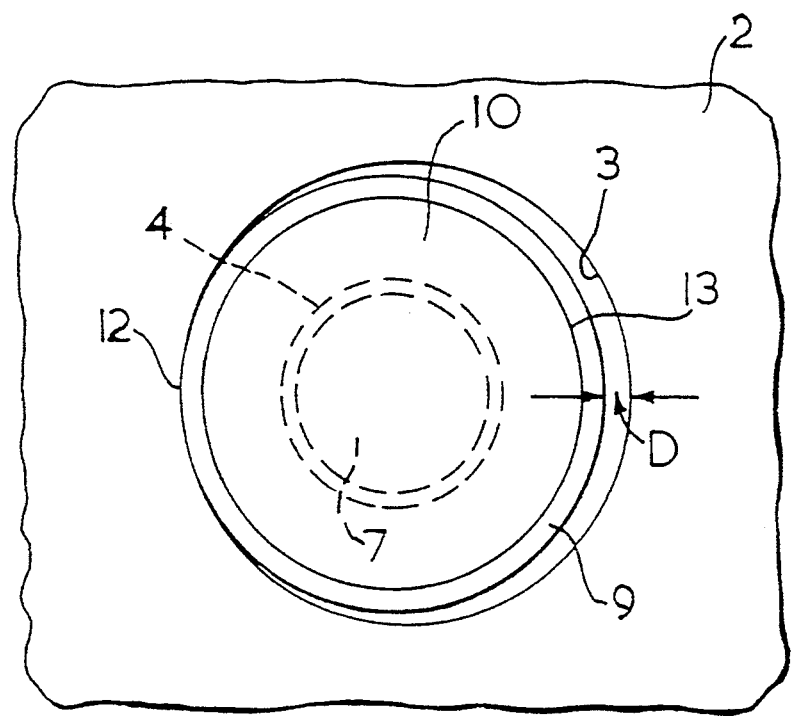
FIG. 11 is a plan view of the weld-in part of FIG. 10.

FIG. 11 shows the weld-in part 4 according to FIG. 10 together with the component 2, more specifically as viewed from the side of the camber 10. FIG. 11 shows the projection of the thin disc 9A, extending beyond the edge 13, relative to the camber 10. FIG. 11 also shows the distance D from the contact point 12. In this position of weld-in part 4 relative to component 2, the distance D corresponds to about twice the difference in the diameters of weld-in part 4 and recess 3.

Figure 12:
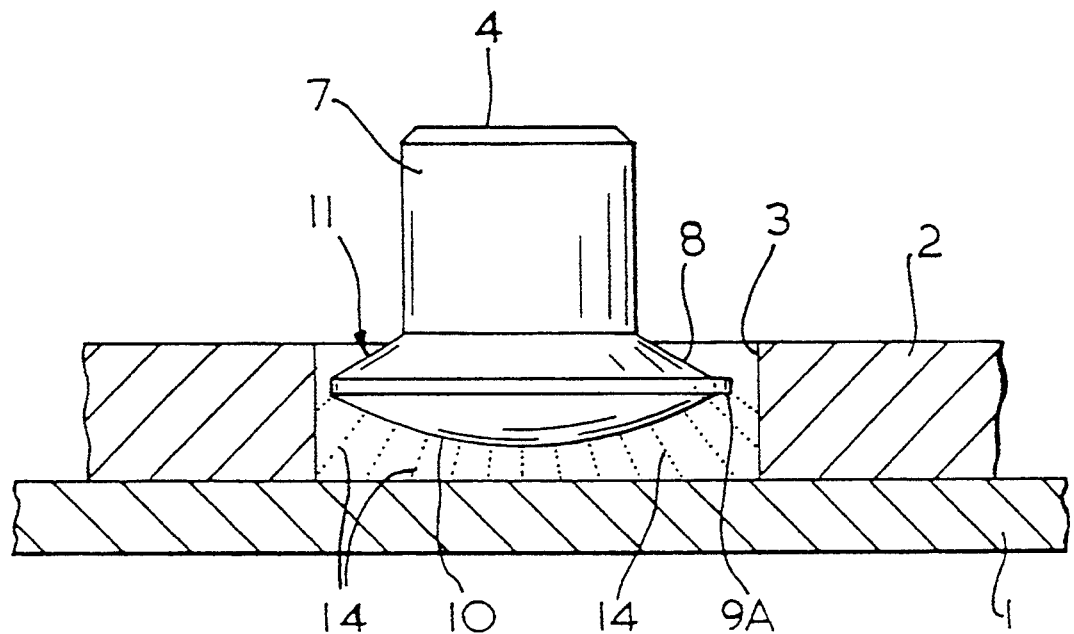
FIG. 12 shows the weld-in part of FIG. 10 with a firing arc.

FIG. 12 shows how the melting process initially takes place in the region of the contact point 12 (see FIG. 10) after the arc has been switched on (represented by the radiating lines 14). The thin disc 9A is reduced here by melting until it passes into the region of the cone 8 and the camber 10, and as the distance between the remainder of the thin disc 9A and the internal wall of the recess 3 increases, the arc is distributed, in particular over the camber 10, which therefore melts and leads to a molten pool on the bottom of the component 2 on the surface of the carrier 1, into which pool the weld-in part 4 is finally immersed, the molten pool extending over the entire camber 10, the opposing region of the carrier 1 and the internal wall of the recess 3. A secure weld between component 2 and carrier 1 is finally produced in this way by the molten material which has melted from the thin disc 9A.

Figure 13:
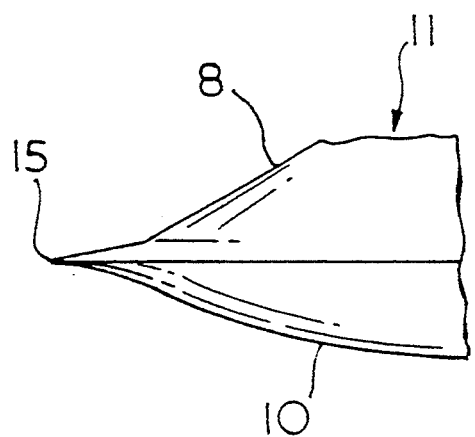
FIG. 13 shows a variation of the design of the rim of the weld-in part of FIG. 10 with a sharply issuing edge.

FIG. 13 shows a detail of a variation of the design of the weld-in part. In this case, the weld-in part 4 passes via the cone 11 into a sharply issuing cutting edge 15, the camber 10 facing the cone 11 on the other side of the cutting edge 15. The cutting edge 15 projecting similarly to the thin disc 9A of FIG. 10 ensures that rapid melting of the material of the weld-in part 4 can take place in the region thereof. The action of the weld-in part 4 shown in FIG. 13 is basically the same as that of the weld-in part 4 according to FIG. 10.

Figure 14:
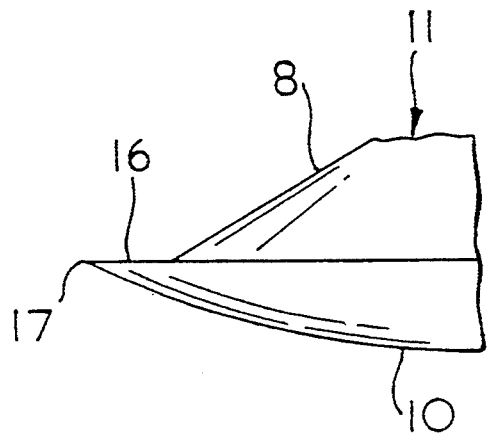
FIG. 14 shows a further variation of the design of the rim of the weld-in part of FIG. 10.

A further design of the weld-in part 4 is shown in FIG. 14. In this case the cone 8 of the weld-in part 4 runs onto a radial face 16 which is limited outwardly by the edge 17 from which the camber 10 extends. Depending on the height of the camber 10, a more or less thin cutting edge-like rim with the relatively sharp edge 17 is therefore formed and can be caused to melt in the manner described with reference to the aforementioned embodiments.

Figure 5:
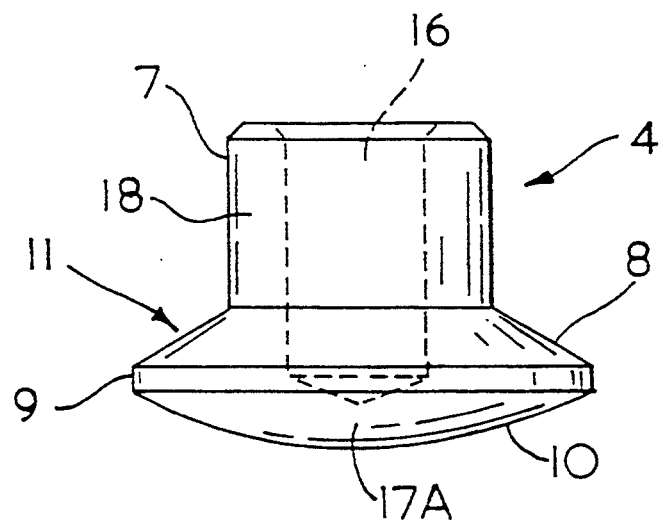
FIG. 5 shows an alternative weld-in part in a side view.
Figure 6:
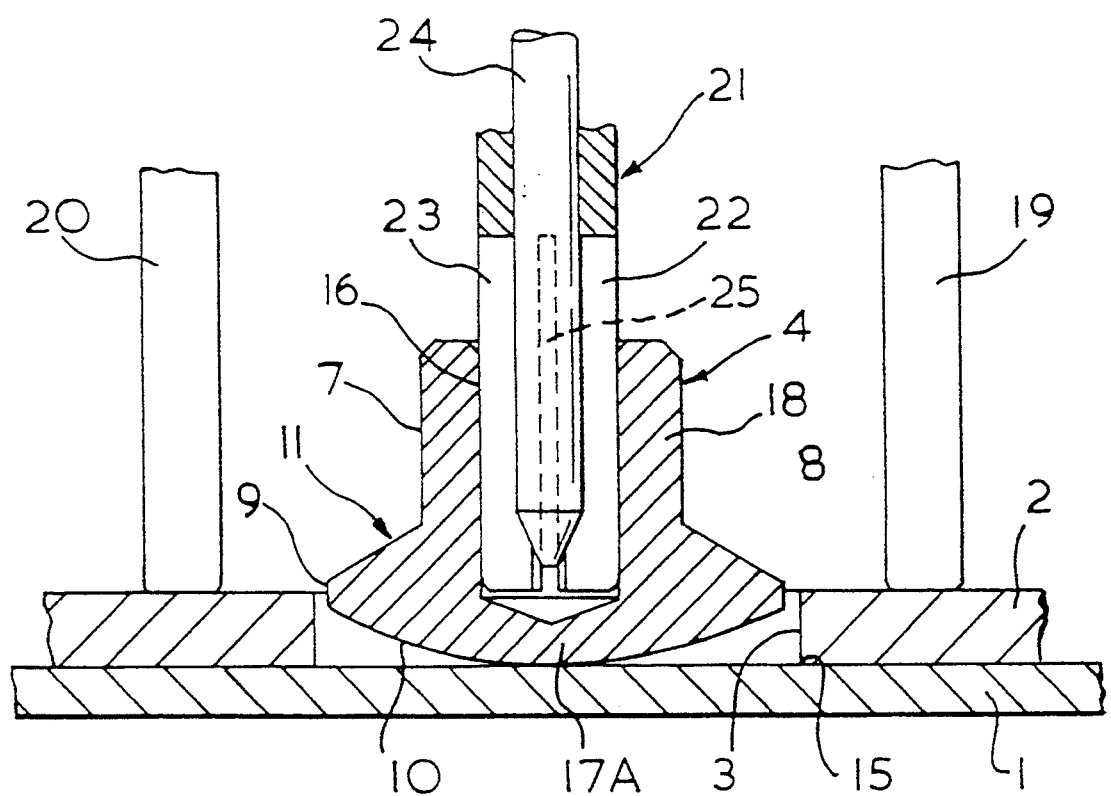
FIG. 6 shows the weld-in part of FIG. 5 gripped by a setting tool and brought into the welding position.
Figure 7:
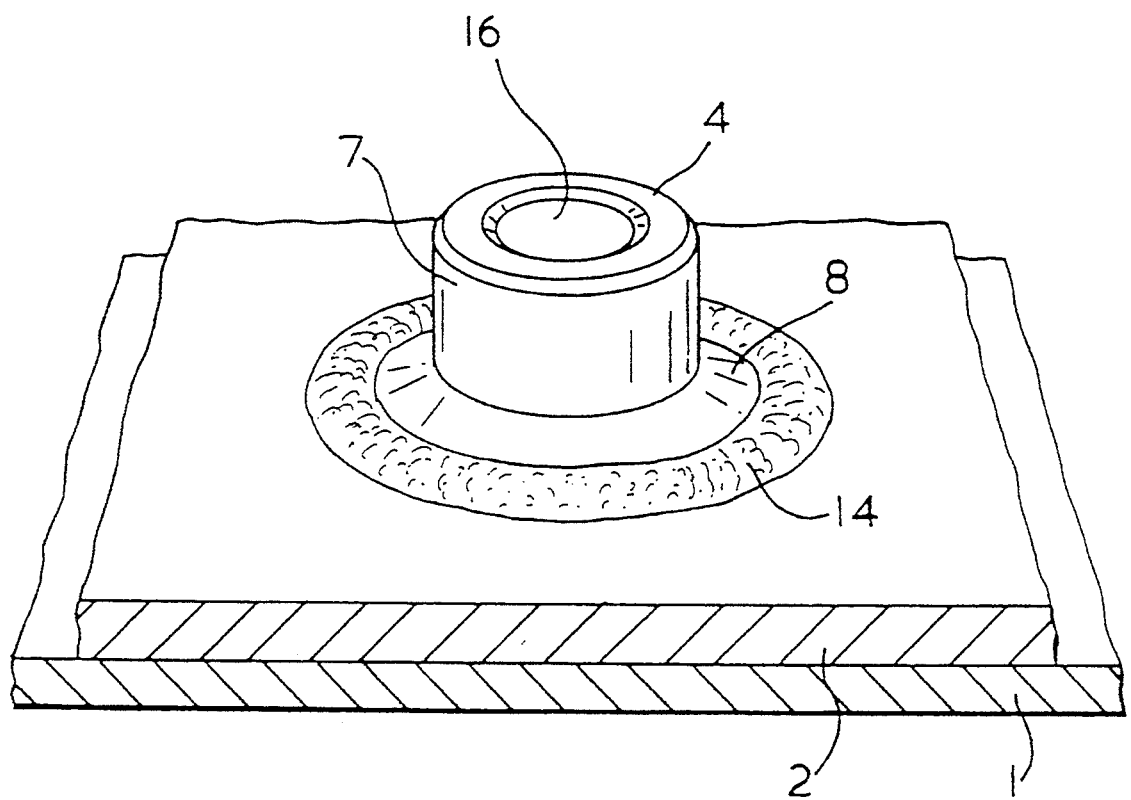
FIG. 7 shows the weld-in part of FIG. 5 welded to a carrier and a metal component.

Referring to the embodiment illustrated by FIGS. 5, 6 and 7, the weld-in part 4 shown in FIG. 5 has shank 7 which is cylindrical in design. The shank 7 passes via the cone 8 into the rim 9 which is also generally cylindrical in shape. The convexly shaped camber 10 adjoins the rim 9. Cone 8, rim 9 and camber 10 therefore form a head 11 of which the external diameter produced by the rim 9 is greater than the diameter of the shank 7. The diameter of the head 11 is smaller than the opening of the recess 3 shown in FIG. 6. The cone 8 forms a step which can also be constructed as a radial face. The bore 16 is provided in the weld-in part through shank 7 and extends into the head 11. The end wall 17A of the bore 16 has a thickness corresponding approximately to the thickness of the wall 18 of the shank 7.

FIG. 6 shows the weld-in part 4 according to FIG. 5 in section, more specifically inserted into the recess 3 in the metal component 2. In the simplest case, the recess 3 consists of a round bore. The metal component 2 lies directly on the carrier 1 consisting of a piece of sheet metal. The metal component 2 is additionally pressed against the carrier 1 by the two pressing members 19, 20.

According to FIG. 6, the conveyance and positioning of the weld-in part 4 is brought about by the setting tool 21 which engages bore 16 with its expanding jaws 22, 23 during the expansion of which the weld-in part 4 is kept tensioned from the interior. The expanding jaws are expanded by means of the expansion mandrel 24 which, as with known expansion tools, urges the expanding jaws 22 and 23 outwardly when driven in between the expanding jaws 22 and 23. The setting tool 21 has a total of four symmetrically-arranged expanding jaws, of which the illustrated expanding jaws 22, 23 are separated from one another by the slot 25. The setting tool 21 is designed as a welding tool, i.e. it is attached to a pole of a voltage source for arc welding. The other pole is connected to the carrier 1. The weld-in .part 4 and the carrier 1 therefore form the two electrodes for arc welding, good contact with the weld-in part 4 being produced owing to the easily produced considerable expanding force of the expanding jaws 22, 23.

The weld-in part 4 is pressed against the carrier 1 by the setting tool 21, the voltage source for arc welding being attached to the weld-in part 4 and the carrier 1, as mentioned above. The welding arc is then struck in a known manner, for which purpose the setting tool 21 is lifted from the carrier 1 together with the weld-in part 4.

An arc is therefore struck between carrier 1 and the weld-in part 4, leading to the formation of a pool of melt and eventually to the welding of the respective parts, as already described hereinbefore.

The final welded joint is shown in a perspective view in FIG. 7. It shows the carrier 1 with the component 2 from which the weld-in part 4 projects. A bead 14 formed by the raised pool of melt extends around the weld-in part 4, additionally embracing the weld-in part 4.

Owing to the bore 16 extending into the head 11, the weld-in part 4 forms a hollow body with a wall having substantially the same thickness, in particular in the region of the wall of the bore 16 and the end wall 17A thereof. As a result, the weld-in part has a relatively low heat capacity, that is to say can be heated suitably rapidly. During the cooling of the weld-in part 4, this process also takes place without a particularly high heat concentration as individual points of the weld-in part, producing a substantially tension-free welding zone after cooling has taken place.

The carrier and the metal component can be metal sheets or the like. It is also possible to design the metal component as a stronger constructional element which then merely has to be provided with the above described recess into which the head of the weld-in part has to penetrate. The described arc welded joint is suitable, in particular, also for the welding of aluminium parts with which welding is known to be difficult. In particular, aluminium sheets can be joined to one another only with difficulty by the known spot welding process as the oxide skin present on the aluminium sheets has to be broken through. In addition, it should be noted during spot welding that the electrodes placed onto the metal sheets are contaminated relatively rapidly and therefore have to be cleaned continually. With the arc welded joint according to the invention, on the other hand, new electrodes are present continuously, namely in the form of the carrier on the one hand and in the form of the weld-in part on the other hand. As particularly high currents are required when welding aluminium, the contact of the weld-in part via the internal wall of its bore with the easily applied high contact pressures has a particularly desirable effect.

We claim:

1. A welded joint comprising
   a sheet-like metal carrier;
   a sheet-like metal component overlying said carrier, said component having a bore therethrough;
   a plug comprising
   a shank; and
   an enlarged head on one end of said shank, at least a portion of said head being located within said bore; said head having a surface surrounding said shank and facing away from said carrier; and
   a solidified body of weld metal in said bore, said body comprising metal from said carrier, said component and said plug, said body being fused to and joining said carrier, said component and said plug;
   said body further extending beyond the surface of said head on the side opposite said carrier to increase the strength of said joint.

2. A welded joint as claimed in claim 1 wherein said body overlies part of said surface of said head.

3. A welded joint as claimed in claim 1 wherein said shank protrudes above said head sufficiently to be engaged by a welding tool.

4. A welded joint as claimed in claim 1 wherein said plug is provided with an axial bore extending through said shank into said head.

5. A welded joint as claimed in claim 4 wherein a wall thickness of said shank around said axial bore is substantially equal to a thickness of an unmelted portion of said head at the end of said axial bore.

6. A welded joint as claimed in claim 1 wherein said shank extends outwardly from said joint in a position to receive fastening elements thereon.

7. A welded joint according to claim 1 wherein the upper surface of said head is tapered conically toward said shank.

8. A welded joint as claimed in claim 1 wherein said body includes metal from an entire surface of said bore in said component.

9. A welded joint as claimed in claim 1 wherein said body overlies part of said surface of said head.

* * * * *